(12) United States Patent
Takeuchi et al.

(10) Patent No.: US 6,942,399 B2
(45) Date of Patent: Sep. 13, 2005

(54) OPTICAL FIBER COUPLER REINFORCING MEMBER AND OPTICAL FIBER COUPLER

(75) Inventors: Nanayuki Takeuchi, Hamakita (JP);
Toshiharu Hoshi, Iwata-gun (JP);
Kenzaburou Iijima, Iwata (JP);
Hidetoshi Yasutake, Hamamatsu (JP);
Yoshikazu Ishii, Tokyo (JP); Satoru Tomaru, Mito (JP); BooSeok Hwang, Tokyo (JP)

(73) Assignees: Yamaha Corporation, Shizuoka-Ken (JP); Richstone Limited, Tokyo (JP)

( * ) Notice: Subject to any disclaimer, the term of this patent is extended or adjusted under 35 U.S.C. 154(b) by 0 days.

(21) Appl. No.: 10/603,783

(22) Filed: Jun. 26, 2003

(65) Prior Publication Data

US 2004/0071415 A1 Apr. 15, 2004

(30) Foreign Application Priority Data

Jun. 27, 2002 (JP) .................................... P2002-188592

(51) Int. Cl.[7] .............................................. G02B 6/255
(52) U.S. Cl. .......................................... 385/99; 385/95
(58) Field of Search ............................. 385/95, 96, 97, 385/98, 99

(56) References Cited

U.S. PATENT DOCUMENTS 5,247,598 A  *  9/1993  Takimoto et al. ............. 385/99
5,295,219 A  *  3/1994  Koya et al. ................. 385/134

FOREIGN PATENT DOCUMENTS

| JP | 57196209 | * 12/1982 |
| JP | 3-267903 | 11/1991 |
| JP | 6-242342 | 9/1994 |
| JP | 11-287925 | 10/1999 |
| TW | 211090 | 8/1993 |
| TW | 320353 | 11/1997 |

* cited by examiner

Primary Examiner—Akm Enayet Ullah
Assistant Examiner—Jennifer Doan
(74) Attorney, Agent, or Firm—Dickstein, Shapiro, Morin & Oshinsky, LLP

(57) ABSTRACT

An optical fiber coupler reinforcing member comprises an approximately rectangular member formed by a hard material, and has a flat surface along the longitudinal direction thereof. In addition, the shape thereof in cross-section is a hexagonal shape which inscribes a cylindrical member. Furthermore, a recess having a U-shaped cross-section is formed in the longitudinal direction of the above-mentioned approximately rectangular member and houses coupling section. The coupling section housed within the recess is fixed at both ends of the recess by an adhesive or the like. In addition, both ends of the inner wall surface of the recess have been given bevel sections. As a result, the optical fiber coupler reinforcing member having high reliability at low cost, with which the strength with respect to external force is improved and with which processability and the assembly operations of the optical fiber coupler are easy, are provided.

16 Claims, 4 Drawing Sheets

OPTICAL FIBER COUPLER REINFORCING MEMBER AND OPTICAL FIBER COUPLER

BACKGROUND OF THE INVENTION

1. Field of the Invention

The present invention relates to an optical fiber coupler reinforcing member and to an optical fiber coupler.

2. Description of the Related Art

Optical fiber couplers have a coupling section (the optical fiber coupler main body) which connects a plurality of optical fibers and, at the coupling section, separate or combine the light within the optical fibers. In addition, the coupling sections are extremely fine compared with the normal optical fiber and are deformed or break simply due to the application of slight external forces, and there is a risk that the function of the coupling section will be lost. Therefore, generally, in optical fiber couplers, the coupling section is protected by being housed within a reinforcing member.

As this reinforcing member, conventionally, an approximately rectangular-shaped member having a square bracket-shaped recess (longitudinal groove) in cross-section in which the coupling section is housed, as shown in FIG. 8, and an approximately cylindrical-shaped member having a C-shaped recess in cross-section in which the coupling section housed, as shown in FIG. 9, have been used. Here, both FIG. 8 and FIG. 9 show cross-sections of conventional optical fiber couplers, and the coupling sections L of the optical fibers are housed in the recesses provided in reinforcing members A and B respectively. The coupling sections L are fixed in the reinforcing members by means of, for example, adhesive.

In addition, in order to prevent changes in the properties, and the like, due to deterioration, deformation, damage, and distortion resulting from differences in the coefficient of expansion of the optical fiber and the reinforcing member due to temperature change, these reinforcing members comprise, for example, quartz, or hard metals having a coefficient of expansion close to that of the optical fiber such as super invar materials and invar materials or the like, and for the case of a metal member, the surface thereof is subjected to gold plating.

In addition, metal members which form these reinforcing members usually have a surface roughness of less than 1 $\mu$m, for example, for super invar materials or invar materials, the surface roughness is 0.4 to 0.7 $\mu$m.

However, according to the above-mentioned conventional technology, for the reinforcing member comprising the approximately rectangular member having a square bracket-shaped cross-section (hereinafter referred to as the first conventional technology), when a force F is applied from the outer wall surface W1 toward the wall surface W2 of the recess, that force becomes concentrated on the corner C1 formed by the wall surface W2 and the bottom surface W3 of the recess, and therefore, there is a problem that the section of corner C1 becomes brittle, and the recess of reinforcing member A is damaged (refer to FIG. 8).

On the other hand, for the reinforcing member comprising an approximately cylindrical-shaped member having a C-shaped cross-section (hereinafter referred to as the second conventional technology), since the outer wall surface W4 and the wall surface W5 of the recess comprise a curved surface, a force F applied from the outer wall surface W4 is spread over the entire wall surface W5 and does not become concentrated on a specific section, and therefore, it is possible to prevent damage to the recess of reinforcing member B due to that force. However, with the above-mentioned second conventional technology, there is a problem that it is not easy to keep the reinforcing member B stationary on a flat work bench, and the working efficiency of housing the coupling section of the optical fiber coupler within the recess is remarkably reduced (refer to FIG. 9).

In addition, with respect to flat-surface processing and curved-surface processing, the cost of curved-surface processing is high, and therefore, with the reinforcing member which uses the above-mentioned second conventional technology which has more curved surfaces, there is a tendency for manufacturing costs to be higher.

In addition, since in both of the above-mentioned first and second conventional technologies, both ends of the respective recesses have sharp edges, there is a possibility that the optical fiber will become damaged or cut by contact with those parts.

In addition, when the reinforcing member is a super invar material or an invar material, metal plating is carried out in order to supplement anti-corrosiveness, but it is impossible to obtain sufficient anti-corrosiveness to prevent rust from occurring on the reinforcing member, and as a result, rust occurs on the reinforcing member, and there is a possibility that the properties of the optical fiber coupler will change. In addition, in that case, since the surface of the reinforcing member is very smooth, the adhesive which is used to fix the coupling section L cannot obtain sufficient adhesive strength through the anchoring effect. For that reason, when an external force is applied to an optical fiber connected to the coupling section, there is a possibility that the adhered section will peel away and become damaged.

The place at which the optical fiber coupler is arranged is not limited to indoors and arrangement outside also occurs. In that situation, in addition to the above-mentioned reinforcing member, the optical fiber coupler is housed within an external unit having high light shielding properties and air tightness. As the external unit, a cylindrical member being superior in strength is used.

SUMMARY OF THE INVENTION

In light of the above-mentioned problems, the present invention has an object of providing an optical fiber coupler reinforcing member and an optical fiber coupler in which strength against external forces has been improved, and processability and the work of assembling the optical fiber coupler have been made easier, and which are highly reliable and inexpensive.

In order to achieve the above-mentioned object, the optical fiber reinforcing member of the present invention protects and houses the optical fiber coupler main body in a longitudinal groove provided in a shaft member in the longitudinal direction thereof, and characterized in that the longitudinal groove has a roughly U-shaped cross-section, and the shafted member having a flat surface along the longitudinal direction thereof.

According to this invention, since the longitudinal groove in which the optical fiber coupler main body is housed and protected has an approximately U-shaped cross-section, even when external pressure is applied on the optical fiber coupler reinforcing member, that force does not become concentrated on specific parts of the inner wall surface and is spread over the entire inner wall surface of the longitudinal groove. Therefore, it is possible to prevent damage to the optical fiber coupler reinforcing member. In addition, since the shaft member which forms the optical fiber coupler reinforcing member comprises a flat surface which runs longitudinally, the processing of the shaft member is easier compared with one in which the exterior of the whole is curved, and it is possible to keep the shaft member stationary on a flat work bench. As a result, with the optical fiber coupler reinforcing member, it is possible to maintain for a long period of time the function as a reinforcing member without damage from external forces, and it is possible to improve reliability and it is possible for inexpensive production with good processing properties. In addition, the effects that it is possible to improve the workability during the housing of the optical fiber coupler main body and to reduce the number of working hours involved therein, and that it is possible to reduce the manufacturing costs of the optical fiber coupler comprising the reinforcing member can be obtained.

The above-mentioned approximate U-shape cross-section of the longitudinal groove indicates that the inner wall surface of the longitudinal groove does not have corners, and in addition to a U-shape, a shape in which the bottom surface is flat and both corners are curved, a semicircle, an arc, and the like can be mentioned.

In addition, the above-mentioned invention is characterized in that a shape in cross-section of the above-mentioned shaft member is a polygonal shape which inscribes a circle.

According to this invention, since the shape in cross-section of the shaft member is a polygonal shape which inscribes a circle, it is possible to stably and easily house the optical fiber coupler reinforcing member in a cylindrically shaped member.

In addition, the above-mentioned invention is characterized in that the corners of both ends of the above-mentioned longitudinal groove have been beveled.

According to this invention, since the corners of both ends of the longitudinal groove are beveled, and the sharp edges of those parts removed, with the optical fiber coupler reinforcing member, the effects are obtained that it is possible to prevent damage to the optical fiber which comes into contact with the corners of these ends, and reliability as a reinforcing member can be improved.

In addition, the above-mentioned invention is characterized in that the above-mentioned shaft member comprises a super invar material or an invar material having a coefficient of expansion close to that of the optical fiber coupler, and a surface of the shaft member is subjected to chrome plating, tin plating, or nickel plating at a predetermined thickness.

According to this present invention, since the shaft member comprises a super invar material or an invar material, and the coefficient of expansion is equivalent to that of the optical fiber coupler, it is possible to prevent changes in the properties of the optical fiber coupler due to temperature changes, and since the surface thereof has been chrome plated, tin plated or nickel plated, anti-corrosiveness is improved and it is possible to prevent changes to properties of the optical fiber coupler due to rust.

In addition, in order to strengthen the adhesiveness of the plated surface, the surface of the super invar material or the invar material can be roughened or fine cracks (fissures) can be provided in the chrome plating, and thereby the anchoring effect can be increased.

In addition, the present invention is characterized in that the surface roughness of the above-mentioned shaft member is made to be 1 to 100 $\mu$m in the case that chrome plating tin plating, or nickel plating is carried out According to this invention, by making the surface of the shaft member rough, it is possible to obtain in that surface an anchoring ffect for the adhesive. Thereby, with the optical fiber coupler reinforcing member, the adhesive strength to the adhesive is improved and it is possible to protect the optical fiber by reliably fixing it in the reinforcing member by means of the adhesive.

In addition, according to the present invention, since the shaft member comprises a super invar material or an invar material and the surface thereof is chrome plated to a specified thickness, the optical fiber coupler reinforcing member is solidly constructed, and it is possible to obtain an anchoring effect for the adhesive due to the occurrence of fine cracks (fissures) in the surface of the chrome plating in accordance with the thickness of the chrome plating Thereby, with the optical fiber coupler reinforcing member, the adhesive strength to the adhesive is improved and it is possible to protect the optical fiber by reliably fixing it in the reinforcing member by means of adhesive.

Preferably, with a thickness of the chrome plating of 0.5 $\mu$m or greater, it is possible for fine cracks to be reliably generated in the surface of the plating.

In addition, the optical fiber coupler of the present invention is characterized by comprising the above-mentioned optical fiber coupler reinforcing member of the present invention.

According to this invention, since the optical fiber coupler comprises the optical fiber coupler reinforcing member according to the above-mentioned invention, it is possible to realize an optical fiber coupler which can be utilized in various applications and which has high reliability at low cost.

DETAILED DESCRIPTION OF THE PREFERRED EMBODIMENT

In the following, an embodiment of the present invention will be explained with reference to the drawings.

Figure 1:
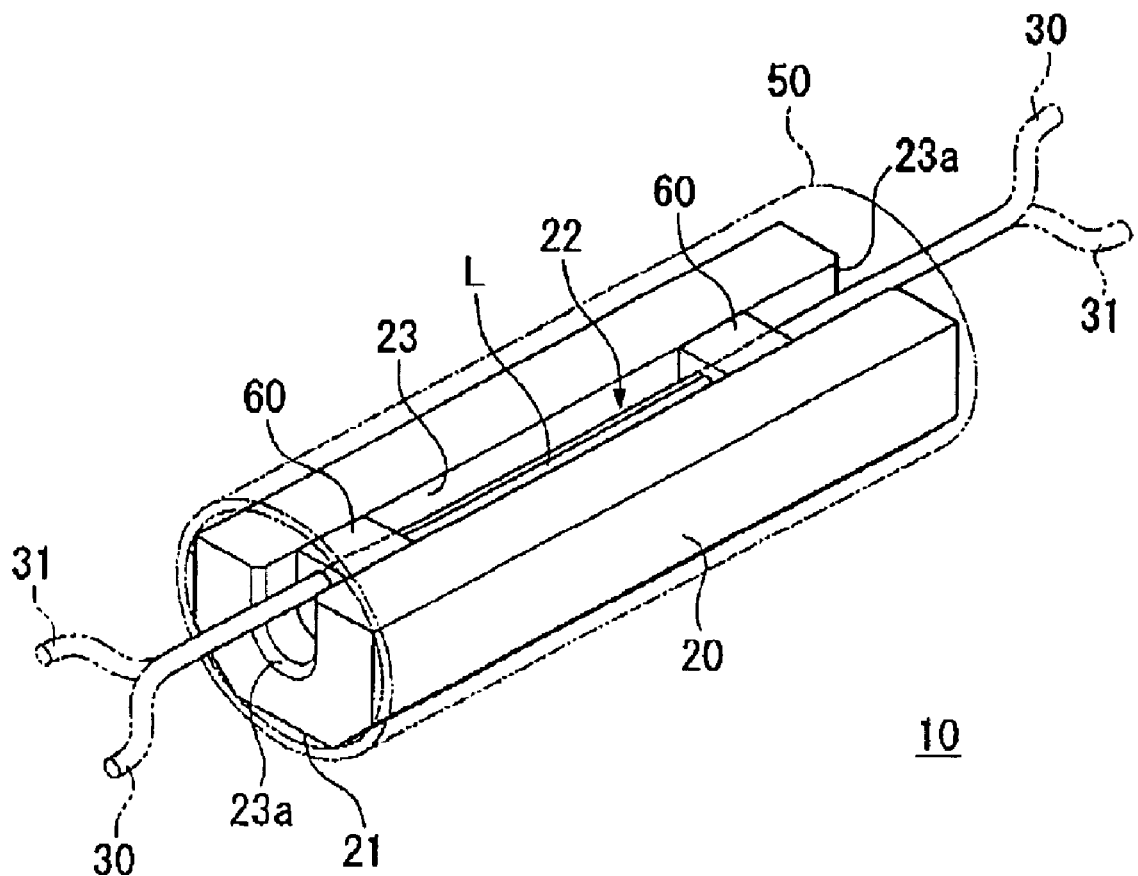
FIG. 1 is a perspective drawing showing the external constitution of an optical fiber coupler according to a first embodiment of the present invention.
Figure 2:
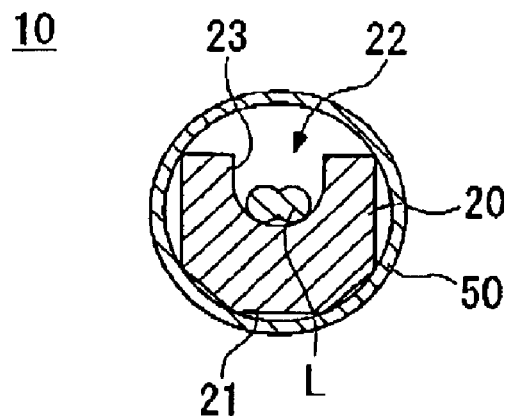
FIG. 2 is a cross-section of the optical fiber coupler of this embodiment along a direction orthogonal to the longitudinal direction thereof.
Figure 3:
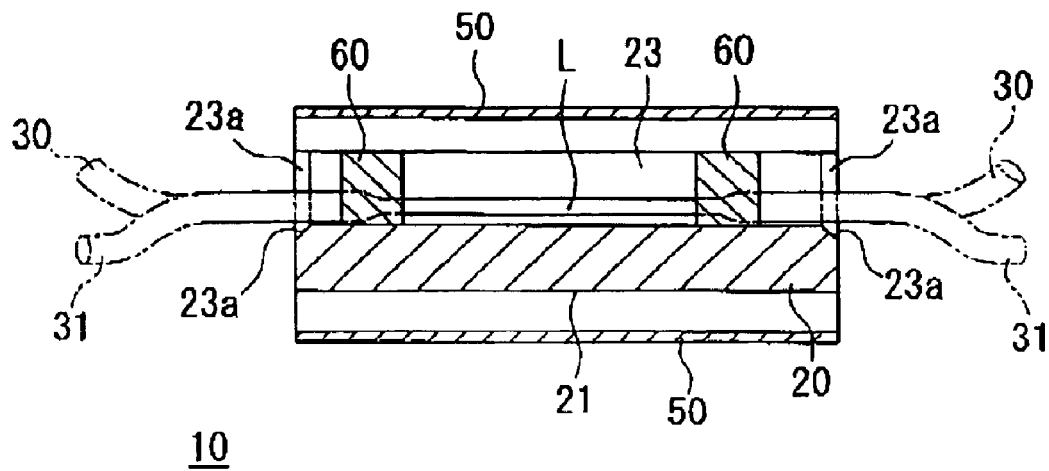
FIG. 3 is a cross-section of the optical fiber coupler of this embodiment along a longitudinal direction thereof.

Each of FIGS. 1 to 3 show the overall constitution of an optical fiber coupler provided with an optical fiber coupler reinforcing member according the present embodiment. FIG. 1 is a perspective view showing the external constitution of an optical fiber coupler according to the present embodiment. FIG. 2 is a cross-section of the optical fiber coupler shown in FIG. 1 along a direction orthogonal to the longitudinal direction thereof. FIG. 3 is a cross-section of the optical fiber coupler shown in FIG. 1 along a longitudinal direction thereof. In these figures, an optical fiber coupler 10 according to the present invention comprises an optical fiber coupler reinforcing member 20 and a coupling section L, in which two optical fibers 30 and 31 are joined, housed within the optical fiber coupler reinforcing member 20. In addition, in this embodiment, the optical fiber coupler 10 can be housed within a cylindrical member 50 having air tightness and light shielding properties.

The optical fiber coupler reinforcing member 20 comprises an approximately rectangular member formed from a hard material such as quartz, a ceramic, or metal, such as a super invar material or an invar material, for example, and has a flat surface 21 along the longitudinal direction thereof. In addition, the cross-section of the optical fiber coupler reinforcing member 20 is hexagonal (polygonal) inscribing the cylindrical member 50. Furthermore, a recess 22 (a longitudinal groove) which has a U-shaped (approximately U-shaped) cross-section is formed longitudinally in the above-mentioned approximately rectangular member, and houses the coupling section L.

In addition, the coupling section L which is housed within the recess 22 is fixed at both ends of the recess 22 by an adhesive 60, or the like. In addition, at both ends, the inner wall surface 23 of the recess 22 has been beveled to produce beveled sections 23a.

In addition, the surface of the optical fiber coupler reinforcing member 20 has been subjected to chrome plating to a plating thickness of 0.5 $\mu$m or greater, tin plating to a plating thickness of 1 $\mu$m, or nickel plating to a plating thickness of 1 $\mu$m or greater, and each of these is electroplating.

Chrome plating can be carried out using, for example, an electrolytic solution of 250 g/l (liter) of anhydrous chromic acid, and 2.5 g/l of sulfuric acid at a temperature of 45 to 55° C. with the application of a current density of 20 to 60 A/dm$^2$.

Tin plating can be carried out using, for example, a sulfurous acid tin plating solution at a temperature of 15 to 25° C. with the application of a cathode current density of 0.5 to 4 A/dm$^2$ and an anode current density of 0.5 to 2 A/dm$^2$.

Nickel plating can be carried out using, for example, an electrolytic solution of 21 g/l of nickel sulfate, 28 g/l of lactic acid, 2.3 g/l of propionic acid, and 21 g/l of sodium hypophosphite, at a temperature of 90° C.

With an optical fiber coupler 10 formed in this way, since the recess 22 has a U-shaped cross-section, even when pressure is applied externally on the optical fiber coupler reinforcing member 20, that force is spread over the whole of the inner wall surface 23 of the recess 22. As a result, the external force does not become concentrated on a specific part of the inner wall surface 23, and it is possible to prevent damage to the recess 22.

In addition, since optical fiber coupler reinforcing member 20 has the flat surface 21, it is possible to keep the optical fiber coupler reinforcing member 20 stable and stationary on a flat work bench. As a result, it is possible to improve the efficiency of the assembly operation of the optical fiber coupler 10 in which the coupling section L is housed within the recess 22.

In addition, since the external shape of the cross-section of the optical fiber coupler reinforcing member 20 is polygonal inscribing the cylindrical member 50, it is possible to house the optical fiber coupler reinforcing member 20 within the cylindrical member 50 stably and smoothly, and with superior air-tightness, light shielding properties, and strength.

In addition, since both ends of the inner wall surface 23 have had the sharp edges removed by beveling, there is no danger that the coupling section L or the optical fibers 30 and 31 will be damaged or cut by contact with those parts, and it is possible to house them safely in the recess 22.

Here, in order to test the anti-corrosiveness of gold plating, chrome plating, tin plating, and nickel plating, they were subjected to saline mist for 24 hours based on the neutral saline spray test (JIS H8502). The results were that rust developed with gold plating, but rust did not develop with chrome plating, tin plating, or nickel plating.

Consequently, it has been possible to strengthen anti-corrosiveness sufficiently to prevent rusting when compared with conventional gold plating by providing chrome plating, tin plating or nickel plating an the optical fiber coupler reinforcing member 20.

Figure 7A:
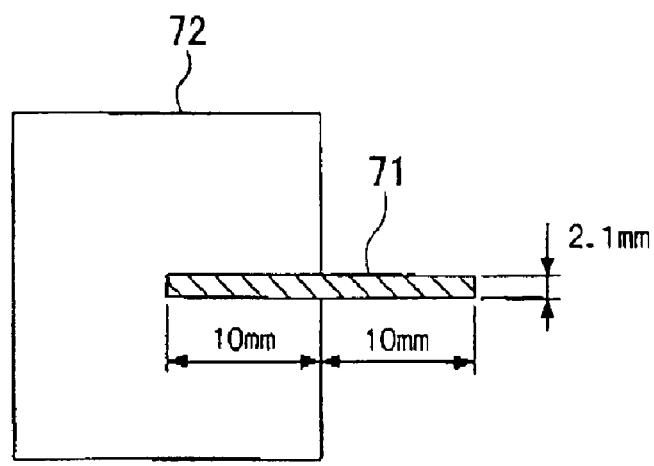
FIG. 7A is a drawing showing a measurement device for adhesive strength.
Figure 7B:
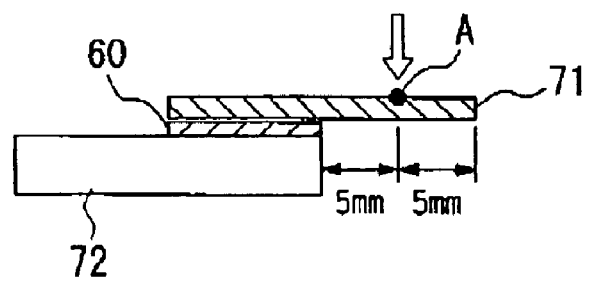
FIG. 7B is a drawing showing the measurement device for adhesive strength.
Figure 8:
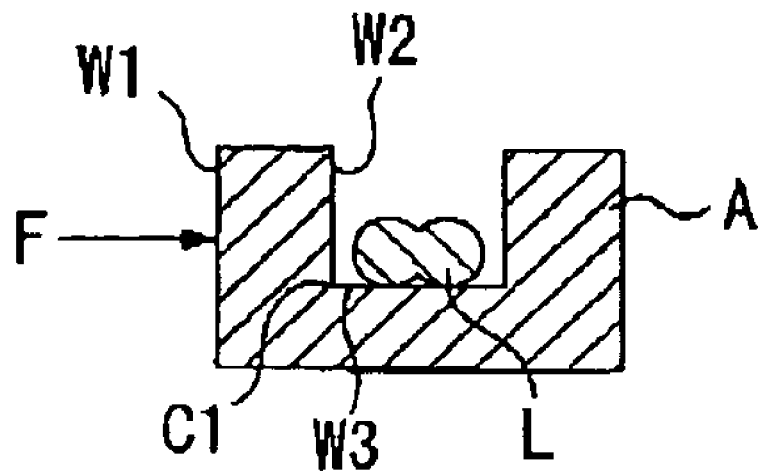
FIG. 8 is a drawing showing an optical fiber coupler according to a first conventional technology.
Figure 9:
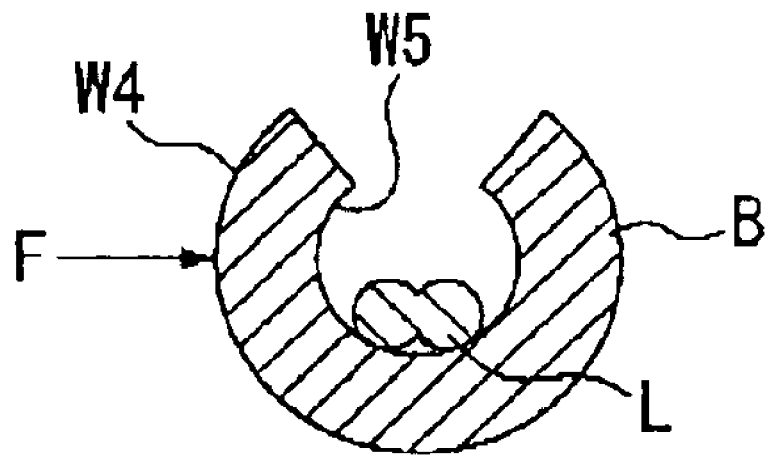
FIG. 9 is a drawing showing an optical fiber coupler according to a second conventional technology.

Using the measuring device shown in FIG. 7, measurement of adhesive strength was carried out for the case in which a test piece was adhered to a board-like member by means of adhesive 60. FIG. 7A is a planar view of the measurement apparatus and FIG. 7B is a front view of the measurement apparatus. In these figures, the test piece 71 is a member used to form the optical fiber coupler reinforcing member 20 and is a rod-shaped member 2.1 mm square. In addition, the board member 72 is a member used to form the optical fiber including the coupling section L and, in this case, it is Pyrex (registered trademark) glass. Test piece 71 was adhered to the board member 72 by adhesive 60. With this measurement device, stress was applied perpendicularly at point A on test piece 71, and, the stress immediately prior to the adhered section of the test piece and the board-like member becoming separated was measured as the adhesive strength.

Moreover, the surface of the member which forms the optical fiber coupler reinforcing member 20 is made to have a roughness of 1 to 100 $\mu$m and is subjected to a suitable plating treatment. As a result, the surface of the optical fiber coupler reinforcing member 20 after the plating treatment exhibits the roughened condition of the base. Therefore, it is possible to obtain an anchoring effect and to improve the adhesive strength. Here, a test piece having a surface roughness of 11 $\mu$m was made by roughening the surface of a super invar material by an acid treatment, and then subjecting it to nickel plating, for example. The adhesive strength was measured and the result was an adhesive strength of 1.76 Pa[N/m$^2$]. However, for a test piece having a surface roughness of 0.5 $\mu$m, the adhesive strength, measured in the same way, was 1.18 Pa[N/m$^2$]. From this, it was possible to confirm that when the surface roughness of the adhesion surface is 11 $\mu$m, an adhesive strength of 1.5 times compared with the case of a surface roughness of 0.5 $\mu$m can be obtained.

In the same way, for the case of tin plating, an adhesive strength of 1.25 Pa[N/m$^2$] was obtained with a surface roughness of 5 $\mu$m, and an adhesive strength of 1.08 Pa[N/m$^2$] was obtained with a surface roughness of 0.5 $\mu$m.

Therefore, it was confirmed that when the surface roughness is 5 μm, an adhesive strength of approximately 1.2 times compared with a surface roughness of 0.5 μm can be obtained.

Furthermore, in the same way, for the case of chrome plating, an adhesive strength of 1.67 Pa[N/m$^2$] was obtained. On the other hand, for the case of gold plating, measured in the same way, an adhesive strength of 0.78 Pa[N/m$^2$] was obtained. From this, it was confirmed that by chrome plating, it is possible to obtain an adhesive strength of approximately 2 times compared with the case for gold plating.

In addition, with the optical fiber coupler reinforcing member 20, it is possible to obtain an anchoring effect for the adhesive due to small cracks generated in the surface of the chrome plating. As a result of this, with the optical fiber coupler reinforcing member 20, since the adhesive strength to the adhesive 60 is improved, it is possible to reliably fix the coupling section L in the recess 22.

Furthermore, the present invention is not limited to the above-mentioned embodiment, and it is of course possible for various changes as long as there is no departure from the gist of the present invention.

Figure 4A:
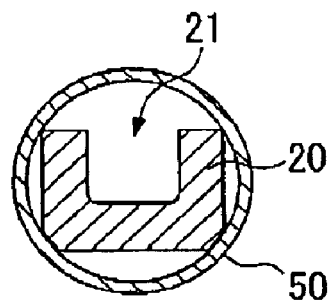
FIG. 4A is a drawing showing an example of the shape in cross-section of recess 22.
Figure 4B:
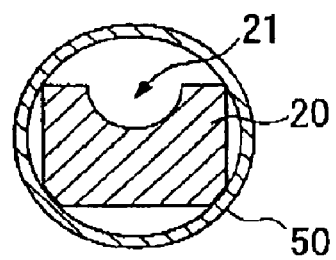
FIG. 4B is a drawing showing another example of the shape in cross-section of recess 22.
Figure 4C:
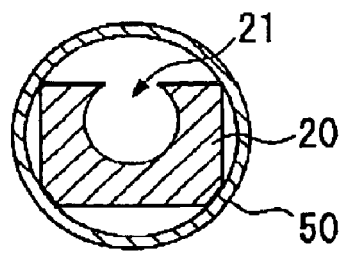
FIG. 4C is a drawing showing another example of the shape in cross-section of recess 22.

For example, in the above-mentioned embodiment, the case in which the cross-section of the recess 22 is U-shaped was explained, but the present invention is not limited to this, and, as shown in FIGS. 4A, 48, and 4C, respectively, a shape in which the bottom surface is flat and both corner parts are curved with a radius of 0.1 mm or greater (FIG. 4A), and a semicircular shape (FIG. 4B) or a circular shape (FIG. 4C) in which the cross-section is simply a curve are also possible. In other words, as the shape of the cross-section of recess 22, as long as the shape is such that there are no corners at which forces externally applied to the optical fiber coupler reinforcing member 20 become concentrated, the shape does not have to be a U-shape.

Figure 5:
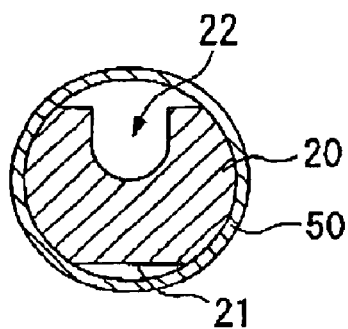
FIG. 5 is a drawing showing an example of the shape in cross-section of the exterior of the optical fiber coupler reinforcing member.
Figure 6:
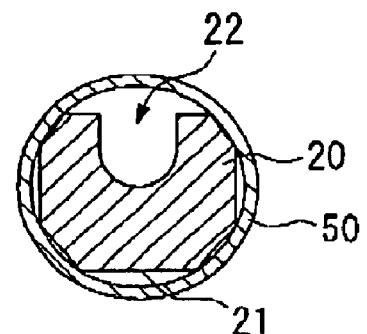
FIG. 6 is a drawing showing an example of the shape in cross-section of the exterior of the optical fiber coupler reinforcing member.

Furthermore, the external cross-section of the optical fiber coupler reinforcing member 20 is not limited to being hexagonal, and as shown in FIG. 5, a circular shape with a section cut away along a straight line is can be employed. More preferably, a polygonal shape which inscribes the cylindrical member 50 and the corners of which all have obtuse angles, as shown in FIG. 6, is also possible. In this way, by making all the corners which inscribe the cylindrical member 50 have obtuse angles, the strength of the corner sections is increased compared with the case of acute angles, and therefore, it is possible to prevent the corners from being damaged by impacts such as when dropped In addition, the size of the beveled sections at both ends of the inside wall surface 23 can be appropriately determined in accordance with the shape, and the like, of the optical fiber.

In addition, in the present embodiment, ceramic and quartz are given as examples of the material used in the optical fiber coupler reinforcing member 20, but the present invention is not restricted to them, and it is possible to appropriately select and use materials having the required strength with respect to external forces.

In addition, in the above explanation, the optical fiber coupler has been described for the case of two fibers, but the same effects can also be obtained for the case in which the present invention is applied to a reinforcing member for a multi-fiber coupler having two or more fibers, and it is possible to obtain sufficient properties such as reliability and optical characteristics in the manufactured coupler.

What is claimed is:

1. An optical fiber coupler reinforcing member for housing and protecting an optical fiber coupler main body in a longitudinal groove provided in the longitudinal direction of a shaft member, wherein the longitudinal groove has a U-shaped cross-section, an exterior bottom surface of the shaft member is a flat surface along the longitudinal direction thereof, and a shape in cross-section of the shaft member is a polygonal shape which inscribes a circle.

2. An optical fiber coupler reinforcing member according to claim 1, wherein corners of both ends of the longitudinal groove are beveled.

3. An optical fiber coupler reinforcing member according claim 2, wherein the shaft member comprises a super invar material or an invar material, and a surface of the shaft member is subjected to chrome plating, tin plating, or nickel plating at a predetermined thickness.

4. An optical fiber coupler reinforcing member according to claim 3, wherein a surface roughness of the shaft member is 1 to 100 μm.

5. An optical fiber coupler reinforcing member according to claim 2, wherein a surface roughness of the shaft member is 1 to 100 μm.

6. An optical fiber coupler reinforcing member according to claim 1, wherein corners of both ends of the longitudinal groove are beveled.

7. An optical fiber coupler reinforcing member according to claim 6, wherein the shaft member comprises a super invar material or an invar material, and a surface of the shaft member is subjected to chrome plating, tin plating, or nickel plating at a predetermined thickness.

8. An optical fiber coupler reinforcing member according to claim 7, wherein a surface roughness of the shaft member is 1 to 100 μm.

9. An optical fiber coupler reinforcing member according to claim 6, wherein a surface roughness of the shaft member is 1 to 100 μm.

10. An optical fiber coupler reinforcing member according to claim 1, wherein the shaft member comprises a super invar material or an invar material, and a surface of the shaft member is subjected to chrome plating, tin plating, or nickel plating at a predetermined thickness.

11. An optical fiber coupler reinforcing member according to claim 10, wherein a surface roughness of the shaft member is 1 to 100 μm.

12. An optical fiber coupler reinforcing member according to claim 1, wherein the shaft member comprises a super invar material or an invar material, and a surface of the shaft member is subjected to chrome plating, tin plating, or nickel plating at a predetermined thickness.

13. An optical fiber coupler reinforcing member according to claim 12, wherein a surface roughness of the shaft member is 1 to 100 μm.

14. An optical fiber coupler reinforcing member according to claim 1, wherein a surface roughness of the shaft member is 1 to 100 μm.

15. An optical fiber coupler reinforcing member according to claim 1, wherein a surface roughness of the shaft member is 1 to 100 μm.

16. An optical fiber coupler comprising an optical fiber coupler reinforcing member according to any one of claims 1, and 2 to 8.

* * * * *